Nov. 15, 1966  R. J. KWIATKOWSKI  3,285,303

MITER TABLE AND SAW

Filed Sept. 25, 1964  2 Sheets-Sheet 1

INVENTOR.
RUDOLPH J. KWIATKOWSKI
BY
Charles L. Lovercheck
attorney

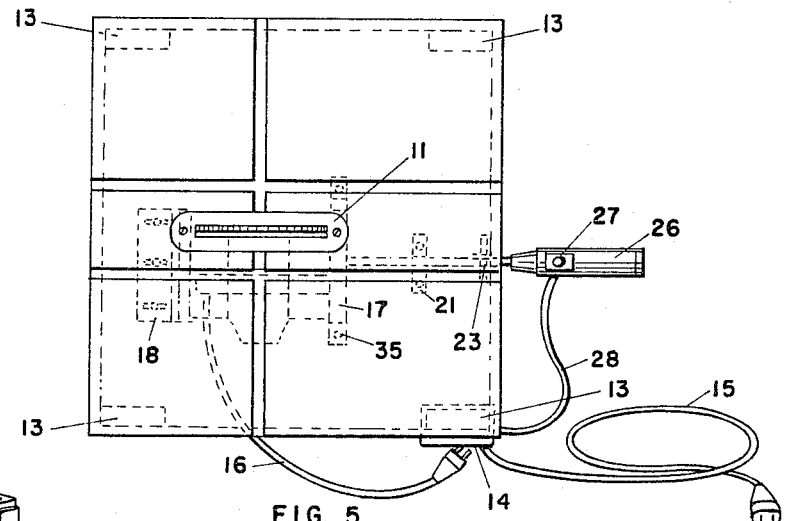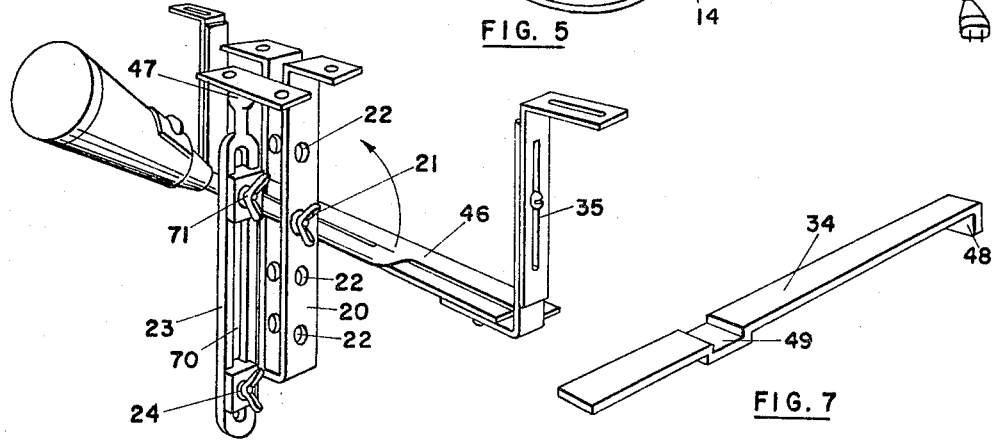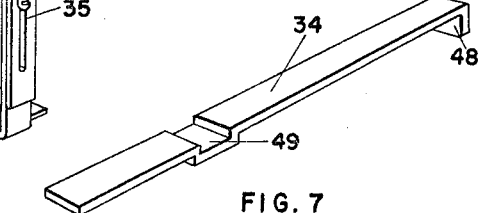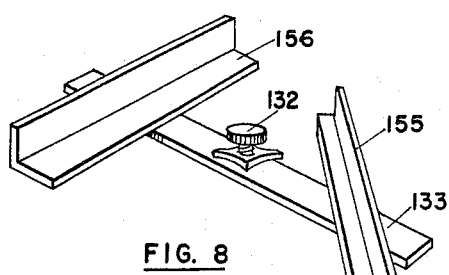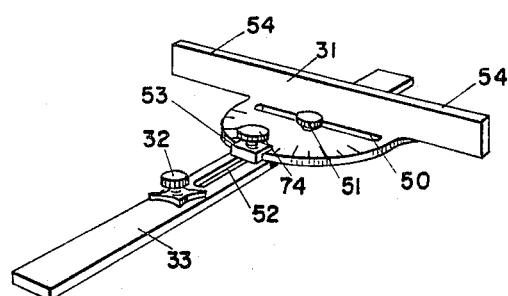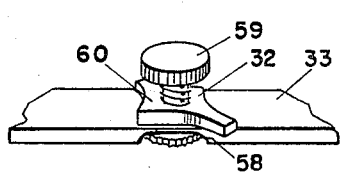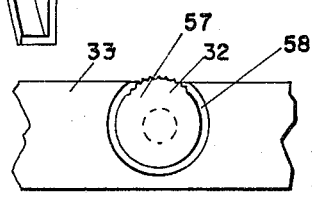

United States Patent Office 3,285,303
Patented Nov. 15, 1966

3,285,303
MITER TABLE AND SAW
Rudolph J. Kwiatkowski, 816 W. 3rd St., Erie, Pa.
Filed Sept. 25, 1964, Ser. No. 399,307
5 Claims. (Cl. 143—132)

This invention relates to attachments for power saws and more particularly to a table whereby a power saw may be attached for cutting miters, such as molding, although it may have many other applications.

One of the objects of the invention is to provide a portable miter table which can be moved quickly into a working area and used in combination with a power saw for cutting accurate miters on moldings and the like.

Another object of the invention is to provide a portable miter table with a handle attachment whereby a portable saw may be raised by lever action in engagement with the molding to be cut.

Another object of the invention is to provide an electrical switch means in the handle of a saw table to turn a motor off and on.

Still another object of the invention is to provide improved saw guides for the table surface for quick and accurate cutting of a miter.

A further object of the invention is to provide a machine which has ease of operation, accuracy and is efficient, time saving and inexpensive in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawings:

FIG. 5 is a top view of the machine according to the invention;

FIG. 6 is a partial perspective view of the saw lifting mechanism;

FIG. 7 is a perspective view of the slot filler;

FIG. 8 is a perspective view of the removable miter guides;

FIG. 9 is a perspective view of the adjustable miter guide;

FIG. 10 is a perspective view of the guide locking mechanism; and

FIG. 11 is a bottom view of the guide locking mechanism shown in FIG. 10.

Figure 1:
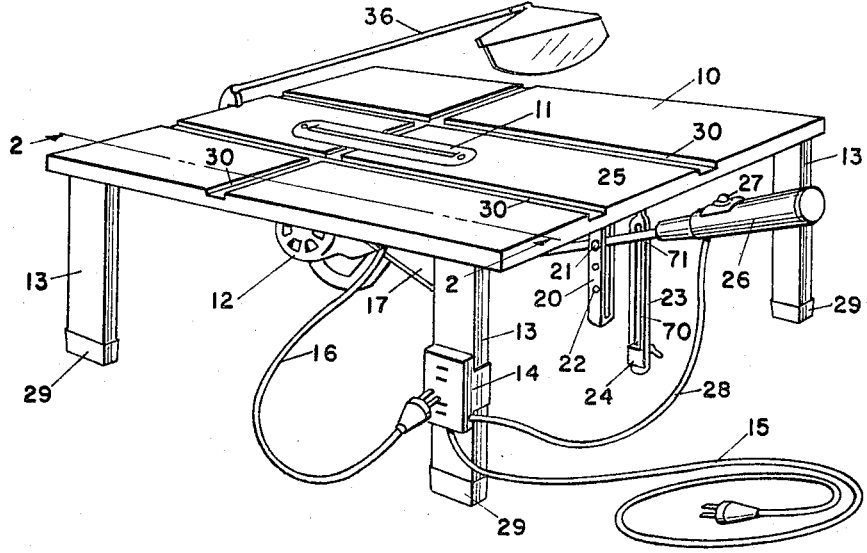
FIG. 1 is a perspective view with a portable saw attached.
Figure 2:
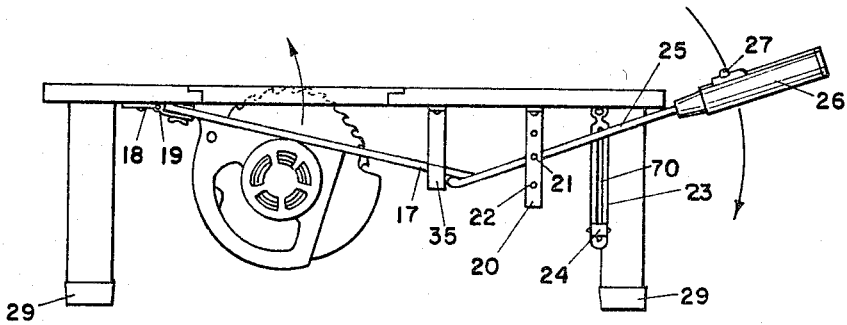
FIG. 2 is a side view taken on line 2—2 of FIG. 1.

Now with more particular reference to the drawings, the invention as shown in FIG. 1 comprises a table top 10 which may be of a square or rectangular shape with an adjustable saw opening 11 in the center through which extends the saw blade of the portable saw 12 attached beneath the top surface. The table top 10 is provided with suitable support legs 13 fastened to each corner of the table. The legs may be of a shape to give solid support to the table and saw and they will be provided with rubber guards 29 to protect the surface upon which the table is placed. The legs will be of a height so the portable saw will not have contact with the surface upon which it is resting. One of the legs will be adapted with a double female receptacle 14 which will be controlled by the switch 27 in the handle 26 and will receive its power supply from cord 15. The cord from the portable power saw 16 will be plugged into the female receptacle 14 and the conventional switch on the power saw should be locked in the on position so that the switch 27 on the handle 26 will have control of the power supply.

The base 17 of the portable saw 12 will slide into the opening 40 in the adjustable bracket 18. The top surface of the opening 40 will have a protective covering 38 made of rubber or the like so that the base of the saw 12 will not be married when tightened into position by tightening bolts 39. Different size saws may be used and adjustment made by sliding the bracket 18 back and forth in the adjustment slots 37. The bracket 18 will have a pivoting hinge so the saw may be lifted into cutting position.

The front part of the saw base 17 will rest in the U shaped bracket 35 and on top of the T shaped rod end 46 on transverse bar of the handle 26. The adjustable height bracket 20 will be U shaped and will be just wide enough to allow the handle rod 25 to pass through. The adjustable height bracket 20 will be provided with adjustment holes 22 and a bolt 21 which will act as the pivoting point when the handle 26 is pushed down. This will cause the saw to move up into cutting position through the opening 11. A handle support 23 will be located directly behind the fulcrum bracket 20 and will have a slot 70 through which the lock bolt 71 extends giving extra support to the handle rod 25. The slot will be provided with a stop 24 which may be set at different levels thus allowing the handle to swing down to the stop and thus allowing the saw to cut at different depths. The top part of the handle support 23 will be provided with a ball and socket joint 47 thus giving the handle 26 more mobility. A pushbutton switch 27 will be integral with handle 26 and will be connected by electric cord 28 to female receptacle 14 thus the electrical power to the saw may be switched on or off by the same hand during the cutting operation.

The table top 10 will be provided with two recessed gauge slots 30 which extend parallel with the saw opening 11 and another slot recessed at right angles thereto. Into these gauge slots 30 the fixed miter guides 133, FIG. 8, may be placed. The miter guides have a fixed straight guide cut 156 and a 45° angle guide 155. The gauge slots 30 may be also provided with the adjustable miter gauge 31, FIGS. 9, 10 and 11, which may be adjusted to the proper angle by opening the radial lock 53. This gauge may be placed at any angle or depth by sliding stud 74 in slot 52 and locking screw 51 in adjustment slot 50. The lateral movement may be locked by tightening locking screw 51. The adjustable gauge 31 will be also provided with extension arms 54 for greater stability. The adjustable miter gauge 31 and fixed gauge 133 will be provided with a locking mechanism 32 and 132 shown in FIG. 8 and in FIGS. 9, 10 and 11. This locking mechanism will have a circular recess 58 in the bottom of the guide and an eccentric wheel 57 therein.

The eccentric wheel 57 will have notched edges so that when the turning knob 59 is turned the notched sides on the eccentric wheel will come in contact with the sides in the slots 30. When the sides are locked in position the locking mechanism 60 which is threadably attached to the turning knob 59 may be turned and this will hold the guide in a locked position until it is released. The purpose of this mechanism is to hold the miter gauge in position when cutting a number of miters the same size and angle.

The table top gauge slot 30 which runs at right angle to the saw opening may be also provided with a slot filler 34. The end of the slot filler 34 will be flanged at 48 to extend over the edge of the table top 10. The slot filler 34 will have a recess 49 providing for the movement of a miter guide smoothly across the table top.

Figures 3, 4:
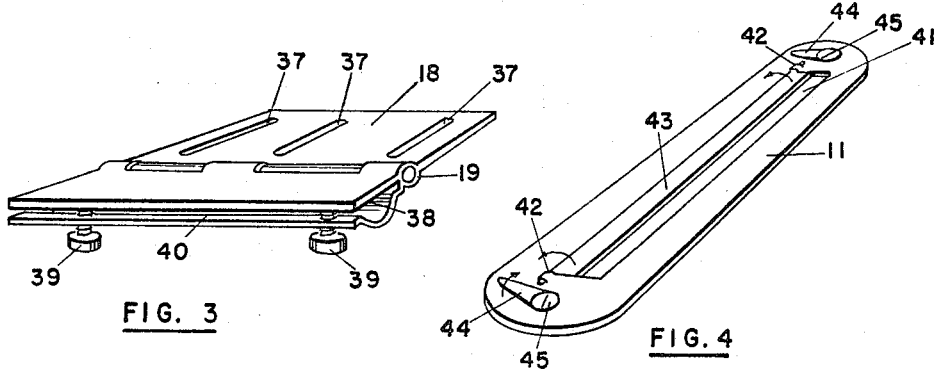
FIG. 3 is a perspective view of the adjustable hinge bracket.
FIG. 4 is a perspective view of the saw opening mechanism.

The table top opening 11 shown in FIG. 4 will be rectangular with rounded ends. The saw opening 41 will be of a suitable length and width to accommodate the saw blades and will have an additional opening provided by raising opening leaf 43 which will be hinged at the ends 42 for 45° angle cuts with the saw 12. When the leaf 43 is rotated back out of the opening a locking catch 44 which is attached to locking catch screw 45 will hold it open.

A safety eye protector 36 may be also attached to protect the eyes when cutting metals, plastics or the like.

The invention herein illustrated and described is subject to modification of construction without departing from the spirit and scope of the invention. Therefore, it is not wished to be restricted to the particular form of construction illustrated and described, but rather to be availed of all modifications that may fall within the scope of the appended claims.

The embodiments of the invention in which an exclusive property or privilege is claimed are defined as follows:

1. A saw and table combination comprising,
    a table top,
    a portable electric saw having a motor base with a first and second side and a first and second end, a motor supported on said base on a first side thereof and a saw blade connected to said motor and extending to said second side of said base opposite said first side,
    means swingably connecting a first end of said base to said table with said second side of said base upward,
    an opening in said table top,
    said saw blade being adapted to extend through said opening,
    a handle rod having a first and second end, said first end of said handle rod being connected to the second end of said base opposite said first end of said base,
    a fulcrum bracket fixed at its upper end to said table and extending downwardly therefrom,
    said bracket having two laterally spaced legs,
    said handle rod being disposed between said legs of said fulcrum bracket,
    said handle rod being pivotally intermediate its ends to said fulcrum bracket,
    a handle support bracket fixed at one of its ends to said table and extending downwardly therefrom,
    and means to fix a second end of said handle rod opposite said first end to said handle support bracket at predetermined positions thereon whereby said saw is supported with its cutting edge a predetemined amount above said table.

2. The combination recited in claim 1 wherein said handle rod has a handle on said second end of said handle rod,
    an electric cord connected to said handle,
    and an electrical switch on said handle connected to said cord and means connecting said cord to said motor.

3. The saw recited in claim 2 wherein said saw table has an electrical receptacle supported on one leg thereof,
    said receptacle comprising said means for connecting said cord to said motor.

4. The saw recited in claim 1 wherein a U shaped bracket has spaced legs attached to the bottom of said table at their upper end and extending downwardly therefrom,
    said U shaped bracket having an intermediate part connecting the lower end of said legs,
    said second end of said handle having a bar attached thereto perpendicular to said handle,
    said second end of said saw base resting on said bar,
    and said second end of said handle having a said T shaped bar.

5. The saw recited in claim 4 wherein said legs of said bracket have means to adjust their length whereby said saw blade may be held in predetermined position relative to said table top.

References Cited by the Examiner

UNITED STATES PATENTS 2,792,032  5/1957  Olsen _____ 143—132 X

FOREIGN PATENTS 222,593  1/1943  Switzerland.

WILLIAM W. DYER, Jr., *Primary Examiner.*

W. D. BRAY, *Assistant Examiner.*